United States Patent
Ohashi

(10) Patent No.: US 10,310,200 B1
(45) Date of Patent: Jun. 4, 2019

(54) OPTICAL TRANSMISSION MODULE AND OPTICAL TRANSMISSION APPARATUS

(71) Applicants: Kabushiki Kaisha Toshiba, Minato-ku, Tokyo (JP); Toshiba Electronic Devices & Storage Corporation, Minato-ku, Tokyo (JP)

(72) Inventor: Kazuyuki Ohashi, Kitakyushu Fukuoka (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/013,021

(22) Filed: Jun. 20, 2018

(30) Foreign Application Priority Data

Mar. 22, 2018 (JP) .................................. 2018-054996

(51) Int. Cl.
*G02B 6/42* (2006.01)
*H04B 10/50* (2013.01)

(52) U.S. Cl.
CPC ......... *G02B 6/4292* (2013.01); *G02B 6/4255* (2013.01); *G02B 6/4256* (2013.01); *G02B 6/4284* (2013.01); *H04B 10/501* (2013.01)

(58) Field of Classification Search
None
See application file for complete search history.

(56) References Cited

U.S. PATENT DOCUMENTS

| 6,499,889 | B1 * | 12/2002 | Shirakawa | G02B 6/3817 257/99 |
| 2003/0171028 | A1 * | 9/2003 | Chang | G02B 6/4246 439/540.1 |
| 2004/0085609 | A1 * | 5/2004 | Fries | G02B 6/4204 359/242 |
| 2005/0124224 | A1 * | 6/2005 | Schunk | G02B 6/4201 439/638 |
| 2005/0191012 | A1 * | 9/2005 | McGarvey | G02B 6/4212 385/88 |
| 2007/0286557 | A1 * | 12/2007 | Tamada | G02B 7/003 385/92 |

(Continued)

FOREIGN PATENT DOCUMENTS

| JP | S63-309036 A | 12/1988 |
| JP | 2000-214354 A | 8/2000 |
| JP | 3250920 B2 | 1/2002 |

*Primary Examiner* — Sung H Pak
(74) *Attorney, Agent, or Firm* — White & Case LLP

(57) ABSTRACT

An optical transmission module includes a receptacle-type optical part, a holder part, and a cover part. The receptacle-type optical part includes a resin molding and a device part. The resin molding is provided with a ferrule insertion hole extending in a first direction and a first fitting part in a surface perpendicular to the first direction. The holder part contains resin and includes a back surface plate provided with a second fitting part fitted to the first fitting part and an upper surface plate provided with a third fitting part provided in parallel to the first direction. The cover part is inserted along the first direction between the holder and receptacle-type optical part. The cover part includes an upper surface plate provided with a fourth fitting part capable of fitting to the third fitting part. The cover part is extractable along the first direction from a housed position.

14 Claims, 10 Drawing Sheets

(56) References Cited

U.S. PATENT DOCUMENTS

| | | | | |
|---|---|---|---|---|
| 2013/0022322 A1* | 1/2013 | Chang | ............. | G02B 6/4292 |
| | | | | 385/92 |
| 2013/0051737 A1* | 2/2013 | Chang | ............. | G02B 6/4292 |
| | | | | 385/92 |
| 2013/0266278 A1* | 10/2013 | Kato | ............. | G02B 6/42 |
| | | | | 385/92 |

* cited by examiner

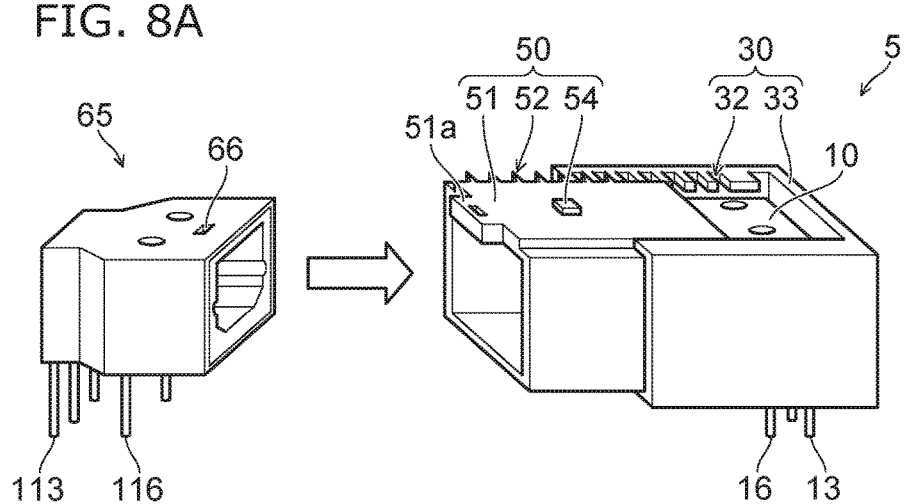
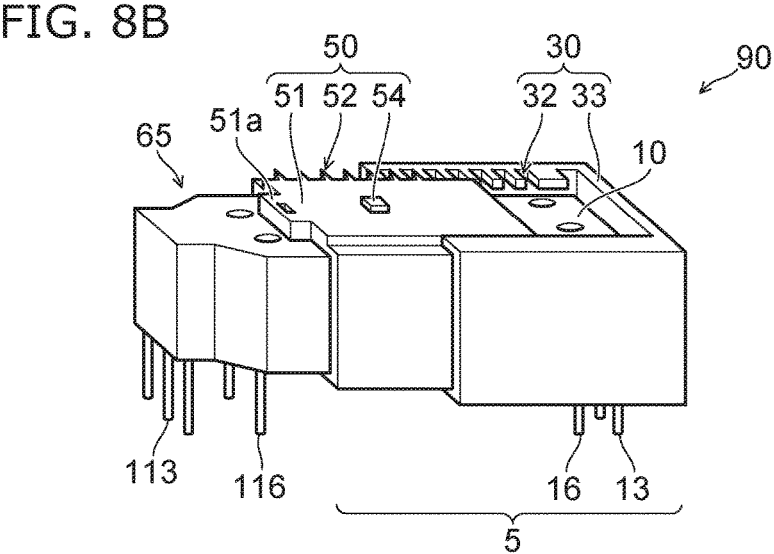

OPTICAL TRANSMISSION MODULE AND OPTICAL TRANSMISSION APPARATUS

CROSS-REFERENCE TO RELATED APPLICATIONS

This application is based upon and claims the benefit of priority from Japanese Patent Application No. 2018-054996, filed on Mar. 22, 2018; the entire contents of which are incorporated herein by reference.

FIELD

Embodiments described herein relate generally to an optical transmission module and an optical transmission apparatus.

BACKGROUND

In electronic equipment used in e.g. FA (factory automation), telecommunication, and OA (office automation), signal transmission is often performed between different power supply systems at input and output.

Direct coupling between different power supply systems is prone to various problems in operation and safety.

Optical transmission modules for free-space transmission are used for electronic equipment having a short transmission distance. Optical transmission modules for fiber-optical transmission are used for electronic equipment having a long transmission distance. Thus, it is necessary to prepare many kinds of products of optical transmission modules.

BRIEF DESCRIPTION OF THE DRAWINGS

FIG. 8A is a schematic view before connecting the optical transmission module of the first embodiment with a JIS F05-compliant optical transmission module, and FIG. 8B is a configuration view of an optical transmission apparatus after connection;

DETAILED DESCRIPTION

An optical transmission module includes a receptacle-type optical part, a holder part, and a cover part. The receptacle-type optical part includes a resin molding and a device part. The resin molding is provided with a ferrule insertion hole extending in a first direction and is provided with a first fitting part in a surface perpendicular to the first direction. The holder part includes a back surface plate provided with a second fitting part fitted to the first fitting part and an upper surface plate provided with a third fitting part provided in parallel to the first direction. The holder part contains resin. The cover part is inserted along the first direction between the holder part and the receptacle-type optical part. The cover part includes an upper surface plate provided with a fourth fitting part capable of fitting to the third fitting part. The cover part is extractable along the first direction from a housed position.

Embodiments of the invention will now be described with reference to the drawings.

Figure 1A:
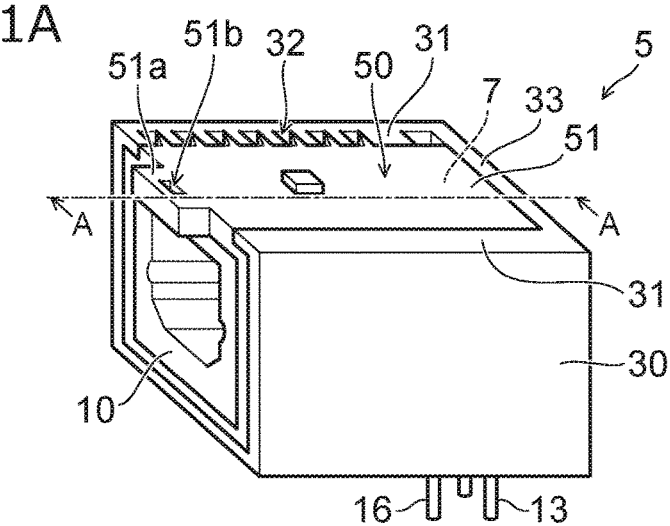
FIG. 1A is a schematic perspective view of an optical transmission module (the cover part being in a housed state) according to a first embodiment.
Figure 1B:
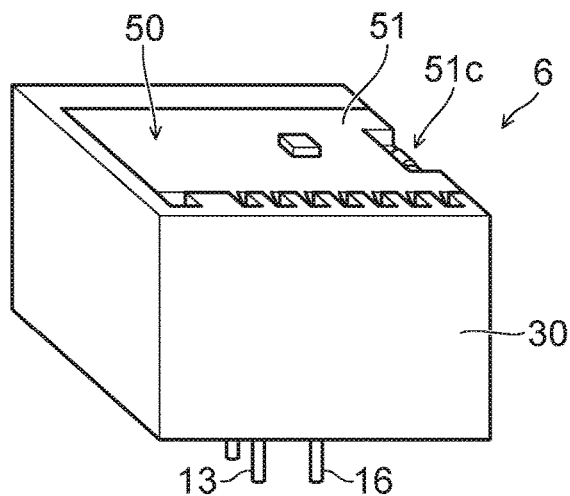
FIG. 1B is a schematic perspective view of an optical transmission module according to a variation of the first embodiment.
Figure 1C:
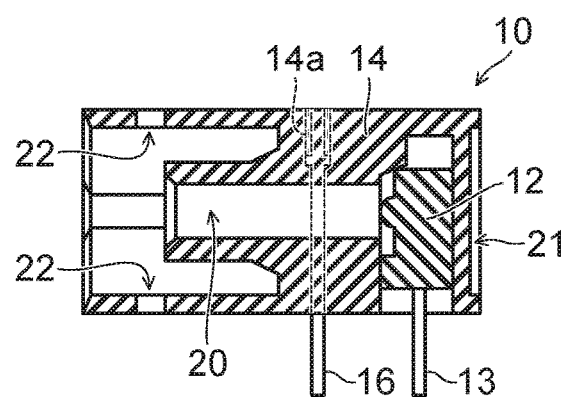
FIG. 1C is a schematic sectional view of the receptacle-type optical part taken along line A-A.

FIG. 1A is a schematic perspective view of an optical transmission module (the cover part being in a housed state) according to a first embodiment. FIG. 1B is a schematic perspective view of an optical transmission module according to a variation of the first embodiment. FIG. 1C is a schematic sectional view of the receptacle-type optical part taken along line A-A.

As shown in FIGS. 1A and 1B, the optical transmission module 5 includes a receptacle-type optical part 10, a holder part 30, and a cover part 50.

The holder part 30 includes a back surface plate 33 provided with a second fitting part fitted to the first fitting part of the receptacle-type optical part 10, and an upper surface plate 31 provided with a third fitting part provided in parallel to a first direction 7. The back surface plate 33 and the upper surface plate 31 can contain resin.

The cover part 50 is inserted between the holder part 30 and the receptacle-type optical part 10. The cover part 50 includes an upper surface plate 51 provided with a fourth fitting part capable of fitting to the third fitting part. The cover part 50 is slidable along the first direction 7 from a housed position. The cover part 50 may be made of a resin material or metal material.

The receptacle-type optical part 10 includes a resin molding 14 and a device part 12. The resin molding 14 is provided with a ferrule insertion hole 20 extending in the first direction 7 and is provided with a first fitting part in a surface perpendicular to the first direction 7. In FIG. 1B, the first fitting part 21 is a recess provided in the resin molding 14. The resin molding 14 is further provided with an optical connector projection socket hole 22. A metal pin 16 is embedded in the resin molding 14 so as to cross the first direction 7. In the device part 12, an optical device (light emitting device or light receiving device), a driving IC, a light receiving circuit and the like are connected to a lead 13 and further sealed with e.g. a transparent resin layer. As shown in FIG. 1A, the side surface of the upper surface plate 51 of the cover part 50 on the opposite side from the back surface plate 33 along the first direction 7 can include a fifth fitting part including a protrusion 51*a*. As shown in FIG. 1B, the fifth fitting part may include a recess 51*c*. Alternatively, two tip parts may abut on each other without providing the fifth fitting part. However, the structure of fitting the protrusion 51*a* to the recess 51*c* is more preferable because two optical transmission modules 5, 6 can be fixed more securely. Fitting an optical transmission module including the protrusion 51*a* to an optical transmission module including the recess 51*c* will be described later in detail.

The light emitting device serving as a light source can be LED (light emitting diode) or LD (laser diode). The wavelength of emission light from the light emitting device is e.g. 300 nm or more and 1.5 µm or less. When the light emitting device is LED, the cover part 50 is made of a light shielding material in the bandwidth of 300 nm to 1.5 µm. This can suppress malfunctions due to disturbance and improve safety of human eyes.

The light receiving device can be a PIN diode made of Si or Ge.

As shown in FIG. 1C, the receptacle-type optical part 10 can include a metal pin 16 penetrating through the resin molding 14. The material of the resin molding 14 can be e.g. a conductive resin containing carbon filler. The cover part 50 can be a metal molding made of e.g. stainless steel. The cover part 50 made of metal is brought into contact with the metal pin 16. The metal pin 16 is connected to a ground pattern of the mounting substrate (not shown). This can enhance the electromagnetic shielding effect and improve noise immunity.

Figure 2A:
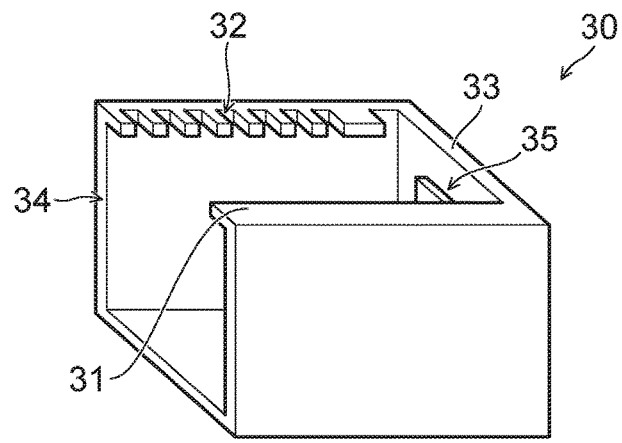
FIG. 2A is a schematic perspective view of the holder part as viewed from obliquely above.
Figure 2B:
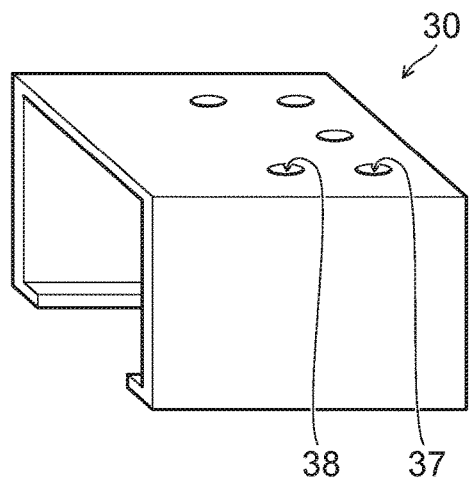
FIG. 2B is a schematic perspective view of the holder part as viewed from obliquely below.

FIG. 2A is a schematic perspective view of the holder part as viewed from obliquely above. FIG. 2B is a schematic perspective view of the holder part as viewed from obliquely below.

In FIG. 2A, the second fitting part 35 is a protrusion. The second fitting part 35 is fitted and fixed to the recess of the first fitting part 21 of the receptacle-type optical part 10. In this case, fixing is further secured by using an adhesive. The second fitting part 35 is provided on the inner wall of the back surface plate 33 of the holder part 30. By suitably selecting the thickness of the cover part 50, the second fitting part 35 enables the front surface of the receptacle-type optical part 10 to be spaced from the holder part 30 at the surfaces (upper surface, inner side surface) other than the outer wall of the back surface plate 33. Fitting can also be achieved by using a recess for the second fitting part and using a protrusion for the first fitting part of the receptacle-type optical part 10.

As shown in FIG. 2B, a through hole 37 for extracting out the lead 13 from the device part 12 may be provided in the lower surface of the holder part 30. Furthermore, a through hole 38 may be provided to extract out the metal pin 16.

Figure 3A:
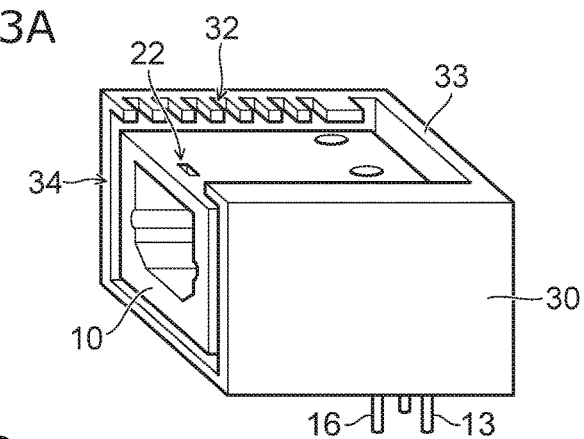
FIG. 3A is a schematic perspective view of the receptacle-type optical part and the holder part fitted to each other.
Figure 3B:
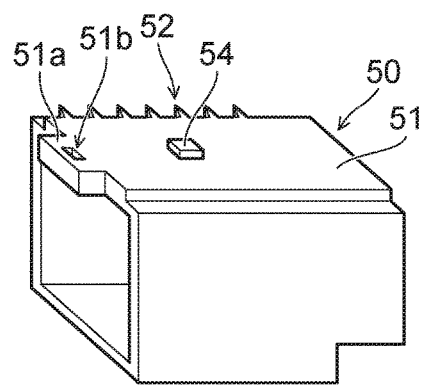
FIG. 3B is a schematic perspective view of the cover part as viewed from obliquely above.
Figure 3C:
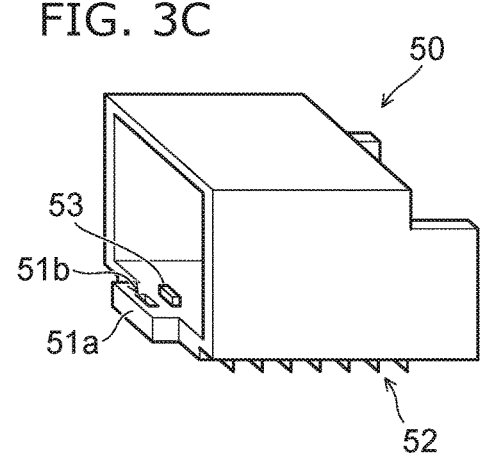
FIG. 3C is a schematic perspective view of the cover part as viewed from obliquely below.
Figure 3D:
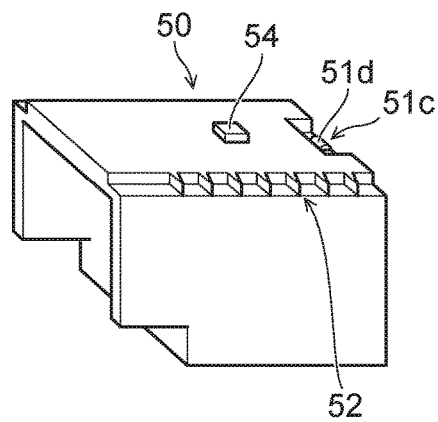
FIG. 3D is a schematic perspective view of a variation of the cover part as viewed from obliquely above.
Figure 3E:
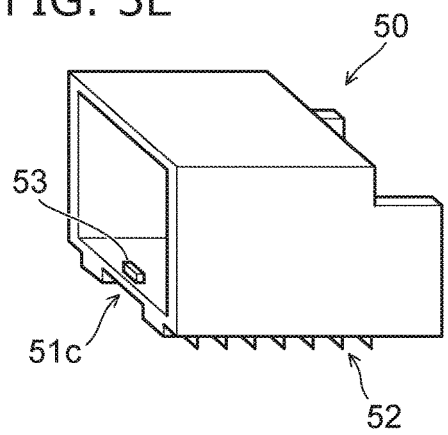
FIG. 3E is a schematic perspective view of the variation as viewed from obliquely below.

FIG. 3A is a schematic perspective view of the receptacle-type optical part and the holder part fitted to each other. FIG. 3B is a schematic perspective view of the cover part as viewed from obliquely above. FIG. 3C is a schematic perspective view of the cover part as viewed from obliquely below. FIG. 3D is a schematic perspective view of a variation of the cover part as viewed from obliquely above. FIG. 3E is a schematic perspective view of the variation as viewed from obliquely below.

As shown in FIG. 3A, an optical connector projection socket hole 22 is provided in the upper surface of the resin molding 14 of the receptacle-type optical part 10 in order to fit an optical connector from below. As shown in FIG. 3B, a first protrusion (not shown) is provided on the inner wall of the cover part 50. This enables fitting to the optical connector projection socket hole 22 from above.

In FIG. 3A, the third fitting part 32 is a rectangular notch in plan view. The fourth fitting part 52 is shaped like a projection. The holder part 30 is a resin molding, and the cover part 50 is a resin molding or metal molding. Thus, when the cover part 50 is slid along the first direction 7 by a second projection 54, these can be elastically deformed and fixed at a prescribed position. The shape of the third fitting part 32 and the fourth fitting part 52 is not limited thereto. For instance, each can be selected from e.g. a circular arc, an elliptical arc, and a polygon in plan view.

FIGS. 3B and 3C show the cover part 50 in which the fifth fitting part is a protrusion 51*a*. The bottom surface region and the side surface region of the cover part 50 from the metal pin 16 to the back surface plate 33 are removed so that the cover part 50 is not in contact with the lead 13 or the metal pin 16 in the housed state. FIGS. 3D and 3E show the cover part 50 in which the fifth fitting part is a recess 51*c*. Also in this case, the bottom surface region and the side surface region of the cover part 50 are each partly removed. The fifth fitting part is fixed by fitting the protrusion 51*a* and the recess 51*c* to each other. As shown in FIG. 3D, a projection 51*d* is provided in the recess 51*c*. The projection 51*d* has a cross section shaped like an upward circular arc. As shown in FIG. 3B, a socket hole 51*b* is provided in the protrusion 51*a*. Fixing can be performed more securely by fitting the projection 51*d* and the socket hole 51*b* in the vertical direction.

Figure 4A:
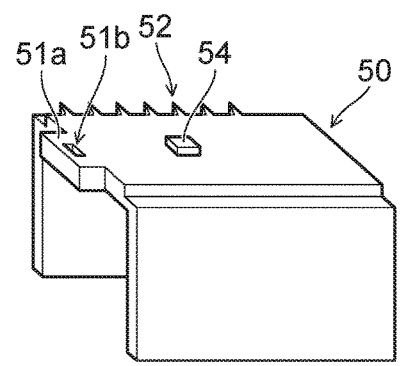
FIG. 4A is a schematic perspective view of the cover part as viewed from obliquely above in which the fifth fitting part is a protrusion and the bottom surface of the cover part is entirely removed.
Figure 4B:
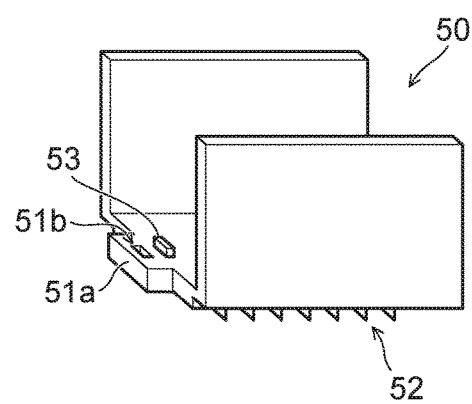
FIG. 4B is a schematic perspective view as viewed from obliquely below.
Figure 4C:
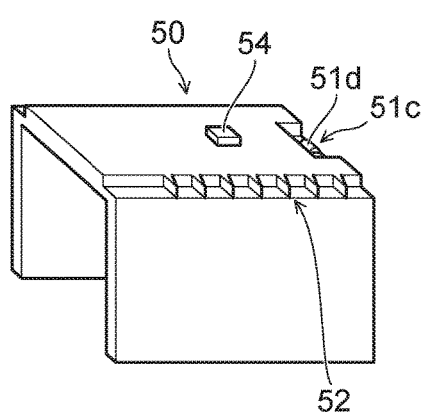
FIG. 4C is a schematic perspective view of the cover part as viewed from obliquely above in which the fifth fitting part is a recess and the bottom surface of the cover part is entirely removed.
Figure 4D:
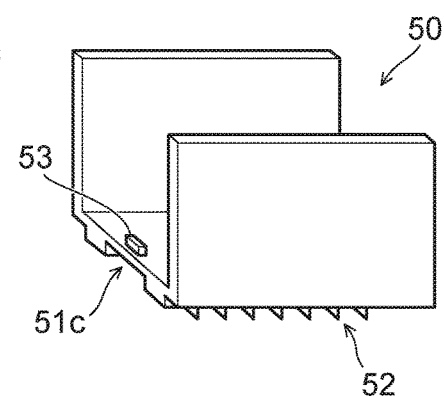
FIG. 4D is a schematic perspective view as viewed from obliquely below.

FIG. 4A is a schematic perspective view of the cover part as viewed from obliquely above in which the fifth fitting part is a protrusion and the bottom surface of the cover part is entirely removed. FIG. 4B is a schematic perspective view as viewed from obliquely below. FIG. 4C is a schematic perspective view of the cover part as viewed from obliquely above in which the fifth fitting part is a recess and the bottom surface of the cover part is entirely removed. FIG. 4D is a schematic perspective view as viewed from obliquely below.

Because the bottom surface of the cover part 50 is entirely removed, the cover part 50 can be extracted in the longest distance irrespective of the position of the metal pin 16 and the lead 13. In this case, the bottom surface of the cover part 50 is entirely removed, and part of disturbance light may leak in. However, the light receiving device is placed in the back surface part of the receptacle-type optical part 10. This can sufficiently reduce the influence of disturbance light.

Figure 5A:
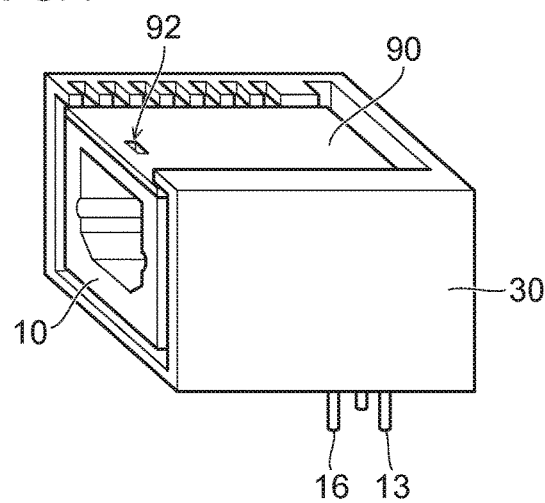
FIG. 5A is a schematic perspective view of an optical transmission module according to a second embodiment.
Figure 5B:
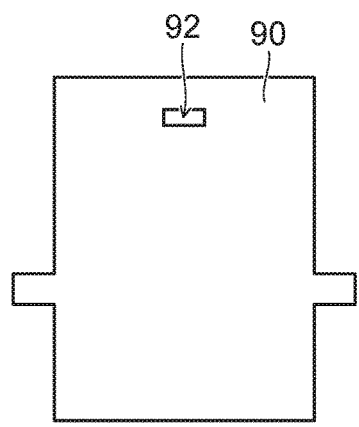
FIG. 5B is a schematic plan view of the metal plate covering the upper surface of the receptacle-type optical part.
Figure 5C:
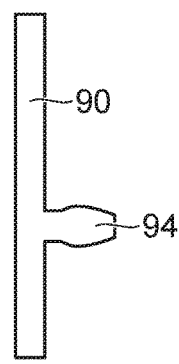
FIG. 5C is a schematic side view of the metal plate.

FIG. 5A is a schematic perspective view of an optical transmission module according to a second embodiment. FIG. 5B is a schematic plan view of the metal plate covering the upper surface of the receptacle-type optical part. FIG. 5C is a schematic side view of the metal plate.

The metal plate 90 is made of e.g. stainless steel. The hook part 94 of the metal plate 90 is inserted into the insertion hole 14a of the resin molding 14. Then, the metal plate 90 can be securely fixed to the receptacle-type optical part 10. For instance, the material of the resin molding 14 can be a conductive resin (e.g. PBT containing carbon filler). The metal pin 16 is connected to GND of the mounting substrate (not shown). This can achieve a high shielding effect irrespective of the position of the cover part 50.

Next, configuration of a point-to-point optical transmission apparatus is described. In this case, the optical transmission module used therein may be different depending on the optical transmission path.

Figure 6:
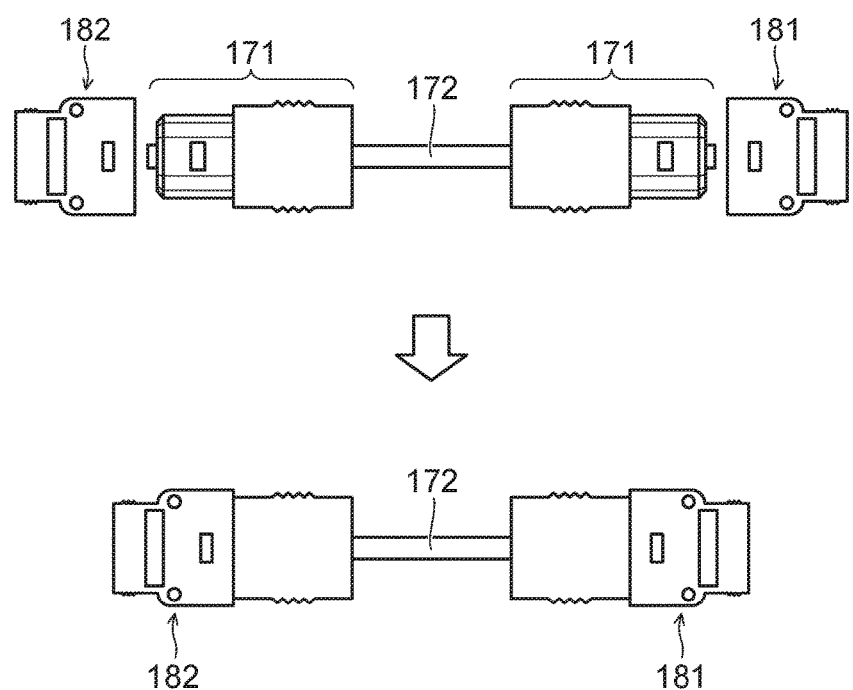
FIG. 6 is a configuration view of an optical transmission apparatus according to a first comparative example in which a JIS F05-compliant optical transmission module and an optical receiving module are connected using an optical connector-equipped optical fiber.

FIG. 6 is a configuration view of an optical transmission apparatus according to a first comparative example in which an optical transmitting module and an optical receiving module are connected using an optical connector-equipped optical fiber.

Attaching/detaching the optical connector-equipped optical fiber 172 on the optical transmission module 181, 182 requires a length enough to grasp the optical connector 171. Thus, it is impossible to realize a transmission distance less than the sum of the lengths of the two optical connectors 171.

Figure 7:
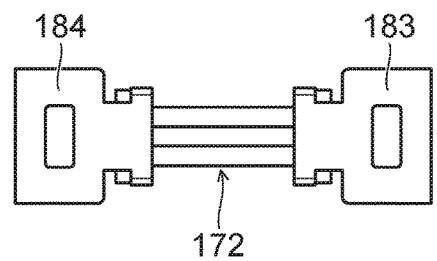
FIG. 7 is a configuration view of an optical transmission apparatus according to a second comparative example based on an optical fiber without an optical connector.

FIG. 7 is a configuration view of an optical transmission apparatus according to a second comparative example based on an optical fiber without an optical connector.

In the second comparative example, no optical connector is used at both ends of the optical fiber 172. Both ends of the optical fiber 172 are connected to the optical transmission modules 183, 184, respectively. Thus, the transmission distance can be made shorter than in the first comparative example. However, in the case where a wide temperature range is required, pistoning occurs due to thermal contraction. This causes a problem such as decreasing the amount of transmitted light of the optical fiber and degrading the transmission quality. Furthermore, both ends of the optical fiber 172 need to be connected to respective optical transmission modules. Thus, the optical transmission module of the first comparative example cannot be used directly. Furthermore, the optical transmission module of the first and second comparative examples cannot provide short-distance free-space transmission.

FIG. 8A is a schematic view before connecting the optical transmission module of the first embodiment with a JIS F05-compliant optical transmission module. FIG. 8B is a configuration view of an optical transmission apparatus after connection.

The optical transmission module 5 of the first embodiment is connected with a JIS F05-compliant optical transmission module 65. The cover part 50 of the optical transmission module 5 of the first embodiment is slid. The projection 53 of the inner wall of the cover part 50 is fitted into the projection socket hole 66 adapted to an optical fiber equipped with a JIS F05-type optical connector. This enables fiberless short-distance free-space transmission in the space inside the cover part 50.

The cover part 50 is made one size larger than the JIS F05-compliant optical transmission module 65. Then, the projection 53 of the cover part 50 is fitted into the projection socket hole 66 of the optical transmission module 65 from above. This facilitates fitting.

Figure 9:
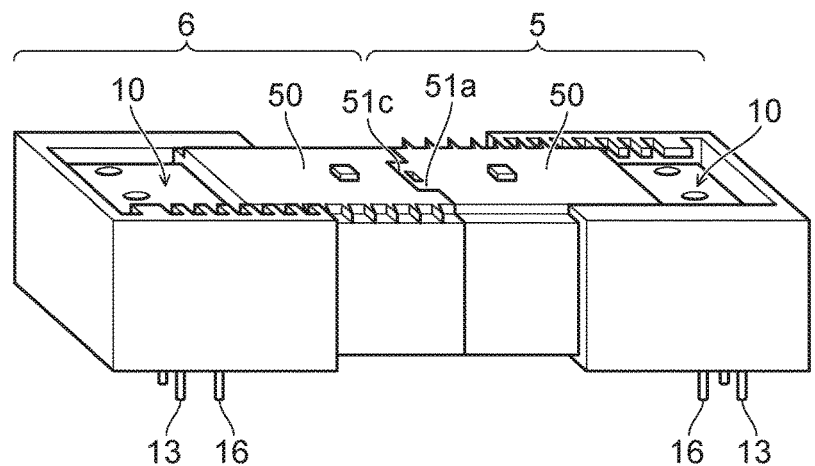
FIG. 9 is a configuration view of the optical transmission apparatus in which two optical transmission modules of the first embodiment are connected.

FIG. 9 is a configuration view of the optical transmission apparatus in which two optical transmission modules of the first embodiment are connected.

When one optical transmission module is an optical transmitter (e.g. 5), the other optical transmission module (e.g. 6) can be an optical receiver. The distance between the optical transmitter and the optical receiver can be minimized by completely housing the cover part 50 in the holder part 30. The distance between the optical transmitter and the optical receiver can be adjusted by sliding the sliding projection depending on e.g. the pattern of the mounting substrate.

The fifth fitting part (protrusion 51a) of the cover part 50 of the first optical transmission module 5 is fitted to the fifth fitting part (recess 51c) of the cover part 50 of the second optical transmission module 6.

For instance, the optical transmitter and the optical receiver can be fixed at a prescribed distance depending on e.g. the pattern of the mounting substrate. Two cover parts 50 can be slid by the sliding projection and abutted on or fixed to each other.

Figure 10A:
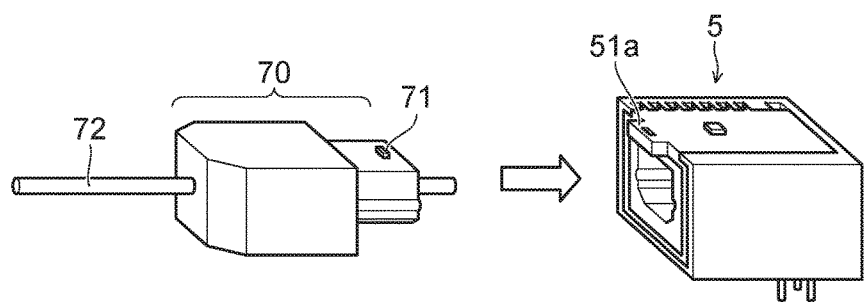
FIG. 10A is a schematic perspective view of the optical transmission module of the first embodiment and a JIS F05-compliant optical connector provided in one end part of an optical fiber.
Figure 10B:
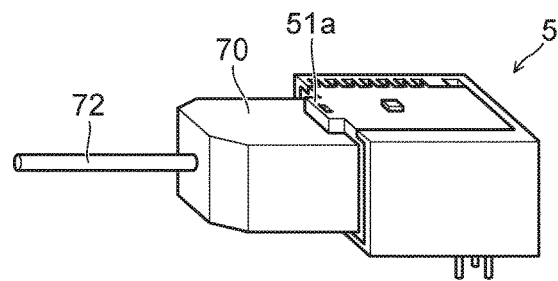
FIG. 10B is a schematic perspective view of the optical transmission apparatus in which the optical connector is fitted into a ferrule insertion hole provided in the resin molding of the receptacle-type optical part.

FIG. 10A is a schematic perspective view of the optical transmission module of the first embodiment and a JIS F05-compliant optical connector provided in one end part of an optical fiber. FIG. 10B is a schematic perspective view of the optical transmission apparatus in which the optical connector is fitted into the ferrule insertion hole provided in the resin molding of the receptacle-type optical part.

The JIS F05-compliant optical connector 70 is inserted into the ferrule insertion hole 20 provided in the resin molding 14 of the receptacle-type optical part 10. In this case, the cover part 50 can be housed in the holder part 30. The optical connector provided in the other end part of the optical fiber can also be connected to an optical transmission module of the first embodiment.

The optical connector projection socket hole 22 provided in the resin molding 14 of the receptacle-type optical part 10 is fitted to the first projection 53 of the cover part 50 from above, and fitted to the third projection 71 of the optical connector 70 from below.

Figure 11A:
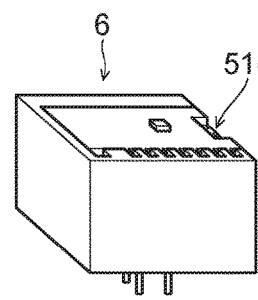
FIG. 11A is a schematic perspective view of the optical transmission module of the first embodiment.
Figure 11B:
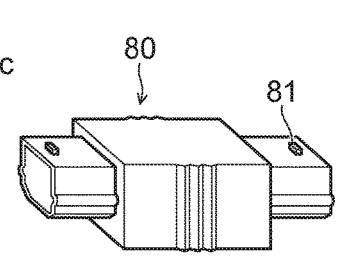
FIG. 11B is a schematic perspective view of a relay adaptor.
Figure 11C:
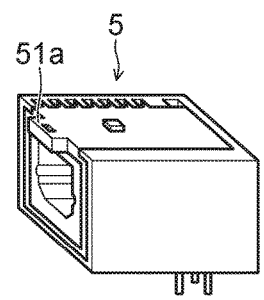
FIG. 11C shows a first optical transmission module.
Figure 11D:
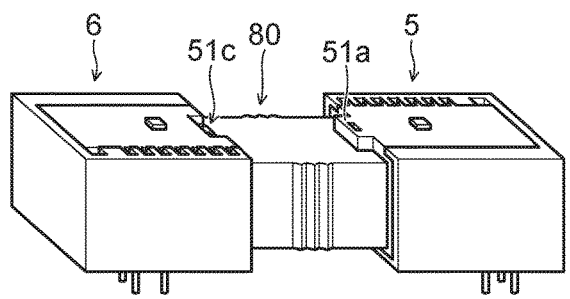
FIG. 11D is a configuration view of an optical transmission apparatus.

FIG. 11A is a schematic perspective view of the optical transmission module of the first embodiment. FIG. 11B is a schematic perspective view of a relay adaptor. FIG. 11C shows a first optical transmission module. FIG. 11D is a configuration view of an optical transmission apparatus.

Two optical transmission modules 5, 6 can be connected by the relay adaptor 80. The cover parts 50 are both in the housed state. The tip part of the relay adaptor 80 is shaped similarly to the tip part of a JIS F05-compliant optical connector. The inside of the relay adaptor 80 is a free space. The fourth projection 81 of the relay adaptor 80 is fitted from below to the optical connector projection socket hole 22 provided in the resin molding 14. This enables short-distance transmission.

The optical transmission module according to this embodiment has a shorter transmission distance and a relatively smaller amount of transmission capacity than the optical communication trunk line. Thus, plastic optical fibers (APF (all plastic fiber) or POF (plastic optical fiber)) or plastic clad quartz optical fibers (PCF) are often used in this embodiment. For instance, in the case of APF, the minimum of transmission loss is approximately 200 dB/km (@600 nm).

In the case of PCF, the minimum of transmission loss is approximately 6 dB/km (@800 nm). Transmission in a shorter distance can be based on free-space transmission. The transmission signal and the optical transmission path significantly vary with e.g. FA equipment and communication equipment. When the light emitting device is LED, for instance, the repetition frequency of pulse signals is often set to 1 Gbit/s or less.

The optical transmission module 5 according to this embodiment achieves easy point-to-point connection to another optical transmission module. That is, this embodiment provides a common optical transmission module supporting e.g. short-distance free-space transmission, transmission through an optical fiber equipped with an optical connector, and transmission through a relay adaptor.

This embodiment provides an optical transmission module in which free-space transmission and optical fiber transmission can be selected depending on the signal transmission distance. An optical transmission apparatus can be configured by coupling the optical transmission modules to each other via e.g. free space, a relay adaptor, or an optical fiber. In the optical transmission apparatus, the electrical signal is transmitted in the state in which the power supply systems of the transmitting side and the receiving side are insulated from each other. Thus, the power supply systems may be different from each other. This enables signal transmission with stable and safe operation. Furthermore, malfunctions due to EMI are suppressed. Such an optical transmission apparatus enables commonality of optical transmission modules. This facilitates cost reduction. Thus, the optical transmission apparatus can be widely used in e.g. FA equipment, communication equipment, and computer optical links.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An optical transmission module comprising:
    a receptacle-type optical part including a resin molding and a device part, the resin molding being provided with a ferrule insertion hole extending in a first direction and being provided with a first fitting part in a surface perpendicular to the first direction;
    a holder part containing resin and including a back surface plate provided with a second fitting part fitted to the first fitting part and an upper surface plate provided with a third fitting part provided in parallel to the first direction; and
    a cover part inserted along the first direction between the holder part and the receptacle-type optical part, including an upper surface plate provided with a fourth fitting part capable of fitting to the third fitting part, and being extractable along the first direction from a housed position.

2. The module according to claim 1, wherein
    the cover part includes a fifth fitting part on a surface of the upper surface plate, the surface being on opposite side from the back surface plate along the first direction, and
    the fifth fitting part includes a protrusion or a recess along the first direction.

3. The module according to claim 1, wherein
    the receptacle-type optical part further includes a metal pin penetrating through an insertion hole provided in the resin molding so as to cross the first direction, and a lead part electrically connected to the device part,
    the cover part contains a metal and can be in electrical continuity with the metal pin, and
    the cover part is partly removed at a bottom surface or a side surface and insulated from the lead part and the metal pin.

4. The module according to claim 2, wherein
    the receptacle-type optical part further includes a metal pin penetrating through an insertion hole provided in the resin molding so as to cross the first direction, and a lead part electrically connected to the device part,
    the cover part contains a metal and can be in electrical continuity with the metal pin, and
    the cover part is partly removed at a bottom surface or a side surface and insulated from the lead part and the metal pin.

5. The module according to claim 3, further comprising:
    a metal plate provided on an upper surface of the resin molding and including a hook part inserted into the insertion hole.

6. The module according to claim 4, further comprising:
    a metal plate provided on an upper surface of the resin molding and including a hook part inserted into the insertion hole.

7. The module according to claim 1, wherein the cover part has a light shielding property for light having a wavelength of 300 nm or more and 1.5 μm or less.

8. The module according to claim 1, wherein the cover part includes a first projection on an inner wall of the upper surface plate.

9. The module according to claim 1, wherein the resin molding of the receptacle-type optical part is provided with an optical connector projection socket hole.

10. An optical transmission apparatus comprising:
    the optical transmission module according to claim 1 used as an optical transmitter or an optical receiver.

11. An optical transmission apparatus comprising:
    two optical transmission modules according to claim 2,
    a first optical transmission module being an optical transmitter,
    a second optical transmission module being an optical receiver, and
    the fifth fitting part of the first optical transmission module and the fifth fitting part of the second optical transmission module being fitted to each other.

12. An optical transmission apparatus comprising:
    two optical transmission modules according to claim 9; and
    an optical fiber provided with optical connectors at both ends,
    the cover part of both the two optical transmission modules being in a housed position inside the holder part,
    the optical connector being provided with a third projection, and
    the third projection being fitted to the optical connector projection socket hole of the resin molding.

13. An optical transmission apparatus comprising:
    two optical transmission modules according to claim 9; and
    a relay adaptor including a fourth projection, the cover part of both the two optical transmission modules being in a housed position inside the holder part, and the fourth projection being fitted to the optical connector projection socket hole of the resin molding.

14. The module according to claim 1, wherein the cover part contains a resin.

\* \* \* \* \*